Figure 1:
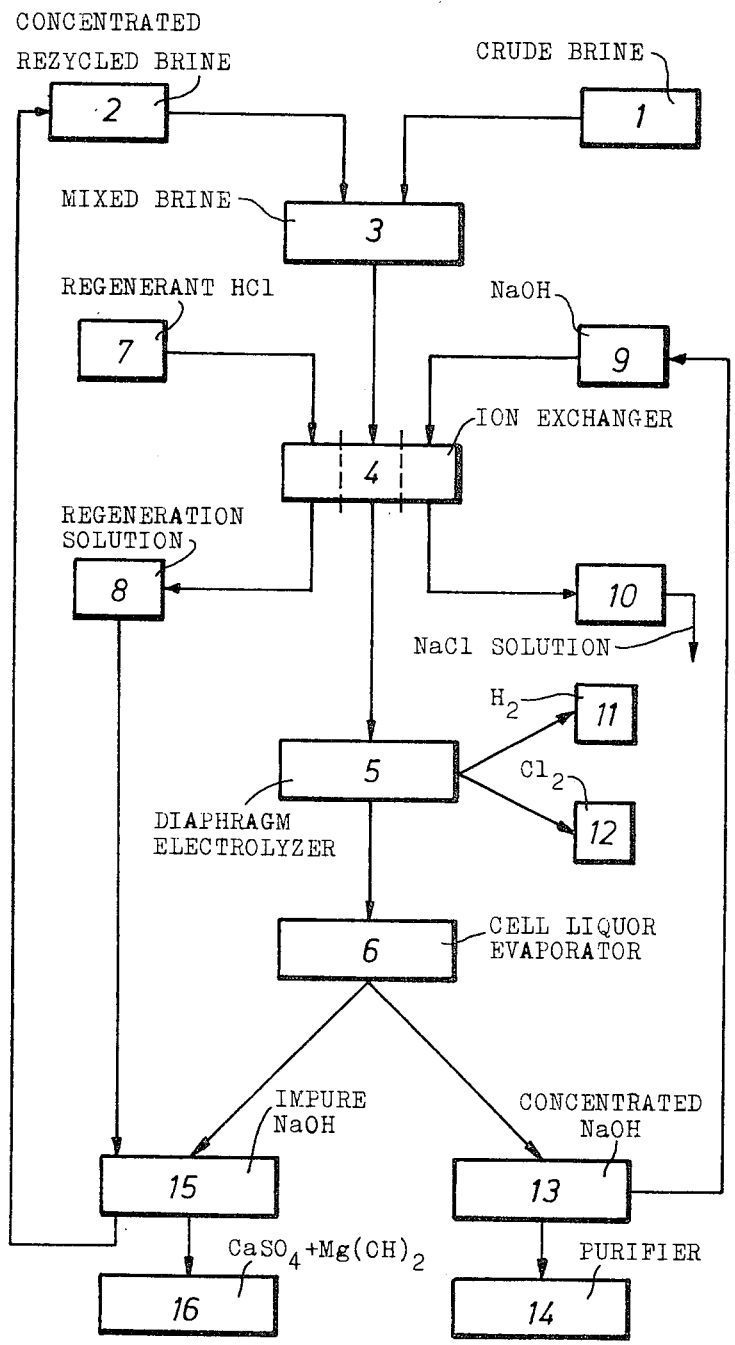

United States Patent [19]

Zirngiebl

[11] 4,078,978

[45] Mar. 14, 1978

[54] PURIFICATION OF ELECTROLYSIS BRINE FOR DIAPHRAGM CELLS

[75] Inventor: Eberhard Zirngiebl, Cologne, Germany

[73] Assignee: Bayer Aktiengesellschaft, Leverkusen, Germany

[21] Appl. No.: 771,057

[22] Filed: Feb. 22, 1977

[30] Foreign Application Priority Data

Mar. 10, 1976 Germany .............................. 2609828

[51] Int. Cl.² .......................... C25B 1/16; C25B 1/26
[52] U.S. Cl. ...................................... 204/98; 204/128; 423/157; 423/166; 423/554; 423/555
[58] Field of Search .................. 204/98, 128; 423/157, 423/166, 554, 555

[56] References Cited

U.S. PATENT DOCUMENTS 3,051,637  8/1962  Judice et al. .......................... 204/98

Primary Examiner—R. L. Andrews
Attorney, Agent, or Firm—Burgess, Dinklage & Sprung

[57] ABSTRACT

In the electrolysis of an alkaline earth metal-containing alkali metal brine wherein the alkaline earth metals contained in the brine are removed, the brine is subjected to electrolysis, and the residual brine is concentrated and recycled for further electrolysis along with make-up fresh brine, the improvement which comprises contacting the alkaline earth metal-containing brine with a weakly acidic cation exchanger in the Na+ form, the exchanger comprising units of at least one of acrylic acid and methacrylic acid, whereby the alkaline earth metals are adsorbed on the cation exchanger, and periodically regenerating the cation exchanger. The cation exchanger is regenerated by contact with a hydrochloric acid solution of about 5 to 10% concentration, the regenerating solution effluent from the column being combined with the redissoluted sodium sulphate which is precipitated during concentration of the cell liquor thereby to precipitate any sulphate contained in the brine as the alkaline earth metal sulphate. Advantageously the precipitation is effected at a pH above about 8 whereby any magnesium present in the brine or regenerating effluent is also precipitated as magnesium hydroxide.

3 Claims, 2 Drawing Figures

PURIFICATION OF ELECTROLYSIS BRINE FOR DIAPHRAGM CELLS

This invention relates to a non-pollutive process for the purification of electrolysis brine for diaphragm cells which, in particular, avoids the pollution of effluents with $SO_4^=$-ions.

The brine required for the electrolysis of alkali metal chlorides by the diaphragm process is obtained almost exclusively by extraction from underground deposits. Since, in addition to NaCl, all salt deposits also contain small quantities of $MgCl_2$ and $CaSO_4$, these substances enter the brine thus obtained to an extent governed by their solubility. For electrolysis by the diaphragm process, the alkaline earth metals present in the brine have to be removed before it enters the electrolysis process because otherwise they are precipitated on the diaphragm and adversely affect the throughput required for electrolysis. On the diaphragm layer, which consists of asbestos, there is a marked increase in the concentration of $OH^-$-ions because a pH-value of the order of 7 or lower prevails in the anode compartment downstream, while approximately 11% sodium hydroxide solution is present in the cathode compartment upstream of the diaphragm (All percentages herein are by weight unless otherwise indicated.)

Removal of the alkaline earth metal cations in accordance with the prior art (cf. for example Winnacker-Kuchler, Chem. Technologie, Vol. I, 1969, and 265) is normally carried out by precipitation, large settling tanks or precoat filters having to be used on account of the poor filterability. The filtration and/or decantation residues are discarded. In this technically complicated process for removing the alkaline earth metal ions, the $SO_4^=$-ions which are introduced into the brine in the form of calcium sulfate and which do not interfere with electrolysis itself are not removed. However, their presence during the further processing of the cell liquor issuing from the diaphragm cell gives rise to further technical problems which hitherto have never been satisfactorily solved. The cell liquor issuing from the diaphragm cell contains only about 11% of NaOH and, depending upon the degree of conversion, up to 16% of NaCl. During the subsequent concentration of the liquor by evaporation, the liquor is concentrated to 50% NaOH, the sodium chloride still present in the liquor being precipitated, preferably along with the last traces of $Na_2SO_4$. In order to be able to reuse the sodium chloride contaminated with sodium sulfate as a starting material in the electrolysis cell, the $SO_4^=$-ions have to be removed beforehand. This result may be obtained to a certain extent by "covering" the sodium chloride precipitated with water, as a result of which all the $Na_2SO_4$ together with a considerable amount of NaCl passes into solution. Discarding the effluent thus obtained which, in addition to $SO_4^=$-ions, still contains considerable quantities of $Na^+$ and $Cl^-$-ions which are lost so far as electrolysis is concerned, represents an unsatisfactory problem of environmental pollution.

A process has now been found which replaces the complicated purification processes described above, avoids pollution of the effluent with $SO_4^=$ions and guarantees better utilization of the sodium chloride brine.

Accordingly, the present invention relates to a process for purifying the brine required for diaphragm electrolysis by ion exchangers which is distinguished by the fact that a weakly acidic cation exchanger of homopolymers or copolymers of acrylic and/or methacrylic acid and in the $Na^+$- form is used and the alkaline earth metals present in the crude brine are adsorbed on the cation exchanger.

The charged cation exchanger can be regenerated with about 5 – 10% hydrochloric acid and converted into the $Na^+$- form with 1 to 10% sodium hydroxide. The cell liquor from the diaphragm electrolysis process may be used with advantage either directly or in dilute form for conversion of the cation exchanger into the $Na^+$-form. The regeneration solution which issues from the cation exchanger during regeneration and which contains up to 6% of $CaCl_2$, may with advantage be reused for precipitating the $SO_4^=$-fraction during dissolution of the sodium chloride precipitated when the liquor is concentrated by evaporation. It is known that precipitation of the $SO_4^=$ in the form of calcium sulfate results in readily filterable gypsum crystals when carried out at elevated temperature.

According to the invention, the ion exchangers used are weakly acidic cation exchangers of homopolymers or copolymers of acrylic and/or methacrylic acid with divinyl benzene or other crosslinking agents, of the type described for example in F. Helfferich "Ionenaustauscher" (Ion Exchangers), Verlag Chemie, 1959, Vol. 1, pages 36 – 37. Ion exchangers such as these are able to remove $Ca^{++}$ and $Mg^{++}$-ions from saturated sodium chloride solution.

Figure 2:
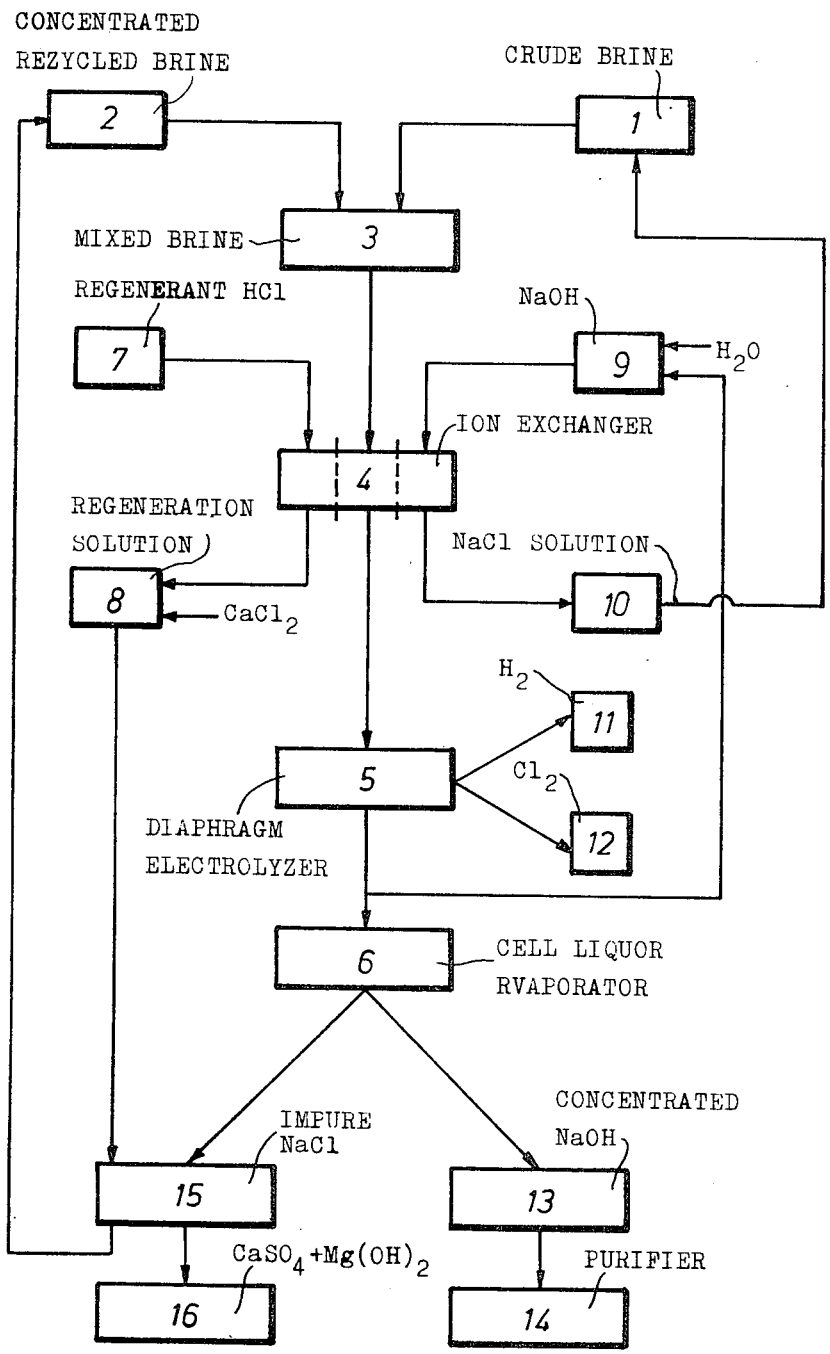

FIGS. 1 and 2 are flow charts of the process according to the invention. The process according to the invention will be described in more detail with reference to these flow charts. The meanings of the reference numerals used are as follows:

1. crude brine
2. brine recovered by the concentration of cell liquor by evaporation
3. brine for use in the electrolysis process
4. ion exchanger
5. diaphragm electrolysis
6. concentration of cell liquor by evaporation
7. 5 – 10% hydrochloric acid for regeneration
8. regeneration solution containing calcium chloride and magnesium chloride
9. 1 – 10% sodium hydroxide for conditioning
10. conditioning solution containing sodium chloride
11. electrolysis product hydrogen
12. electrolysis product chlorine
13. 50% sodium hydroxide obtained by concentration by evaporation
14. further purification of the sodium hydroxide
15. sodium chloride contaminated by sodium sulfate and precipitated during concentration by evaporation
16. calcium sulfate and magnesium hydroxide for dumping.

The sodium chloride brine 3, consisting of substantially equal parts of mined crude brine 1 and brine 2 recovered during concentration of the cell liquor by evaporation, is freed from calcium and magnesium ions in the ion exchanger 4.

The 11% cell liquor issuing from the electrolysis cell, which still contains up to 16% of sodium chloride, is concentrated by evaporation 6 into 50% sodium hydroxide 13, most of the sodium chloride and, finally, the sodium sulfate being precipitated 15. Following separation of the sodium hydroxide 13, the precipitation product 15 is redissolved and the sulfate ions are precipitated in the form of calcium sulfate by addition of the regeneration solution 8. Some times further addition of CaCl₂ is necessary, if there exists a Ca⁺⁺-deficit with respect to SO₄⁻⁻content in the crude brine. The precipitation reaction is preferably carried out at a pH-value above 8 so that the magnesium ions introduced with the regeneration solution 8 are precipitated together with the calcium sulfate in the form of magnesium hydroxid 16. The calcium sulfate acts as a filtration aid and addition nucleus. The approximately 25% sodium chloride solution 2 obtained is fed back into the process. Since the throughflow of brine through the ion exchanger 4 during regeneration and conditioning, i.e. conversion into the Na⁺-form, is continuous, it is best to use several ion exchangers arranged in parallel.

The process according to the invention is illustrated by the following Example.

EXAMPLE

To begin with 1 N sodium hydroxide is introduced into a conventional exchanger column containing 1 liter of a weakly acidic ion exchanger (polyacrylic acid crosslinked with divinyl benzene) in the H⁺-form (rate of flow of the NaOH: 5 $l/h$ × 1 of resin). The ion exchanger is thereby conditioned, i.e. converted into the Na⁺-form. After a throughflow of about 5 liters of 1 N-sodium hydroxide, the column is rinsed with 1 liter of pure water. The brine to be purified is then introduced by way of the exchanger. At a rate of flow of 2.5 liters of brine/h × 1 of resin.

55 liters of pure brine are obtained for a content of 0.6 g of Ca⁺⁺ per liter of crude brine, while 75 liters of crude brine are obtained for a content of 0.3 g of Ca⁺⁺ per liter of crude brine.

After the concentration limit (4 to 6 mg of Ca⁺⁺ per liter of pure brine) has been reached, the column is again rinsed with about 1 liter of pure water. Regeneration of the exchanger i.e. conversion into the H⁺-form, is carried out with 5 % or 10 % hydrochloric acid which is introduced over the resin bed at a rate of 5 liters of hydrochloric acid/h × 1 of resin.

The resin takes up about 22 to 23 g of Ca⁺⁺ from the brine (approximately 1 Val/1 of resin). Since most of the Ca⁺⁺ is dissolved in the form of CaSO₄ in the brine, this quantity of Ca is sufficient, while replacing losses, for binding the quantity of SO₄⁼ which accumulates together with the NaCl in the form of Na₂SO₄ in the liquor concentration stage. In this case, neutral CaSO₄.2H₂O is obtained in the form of a dumpable material, and the entire quantity of NaCl may be fed back into the electrolysis process. In other words, there are at this stage none of the losses of NaCl which would otherwise be inevitable with removal of the SO₄⁼ if it is not desired to use CaCl₂ from another source.

It will be appreciated that the instant specification and examples are set forth by way of illustration and not limitation, and that various modifications and changes may be made without departing from the spirit and scope of the present invention.

What is claimed is:

1. In the electrolysis of an alkaline earth metal-containing alkali metal brine wherein the alkaline earth metals contained in the brine are removed, the brine is subjected to electrolysis, and the residual brine is concentrated and recycled for further electrolysis along with make-up fresh brine, the improvement which comprises contacting the alkaline earth metal-containing brine with a weakly acidic cation exchanger in the Na⁺ form, the exchanger comprising units of at least one of acrylic and methacrylic acid, whereby the alkaline earth metals are absorbed on the cation exchanger, periodically regenerating the cation exchanger, and separating such precipitated alkaline earth metal sulphate by contact with a hydrochloric acid solution of about 5 to 10% concentration, the regenerating solution effluent from the column being combined with the brine during concentration, thereby to precipitate any sulphate contained in the brine as the alkaline earth metal sulphate.

2. The process as claimed in claim 1, wherein the weakly acidic cation exchanger is initially in the H+- form and is converted to the Na+- form by passage of sodium chloride solution therethrough.

3. A process as claimed in claim 1, wherein the alkaline earth metal sulphate precipitation is effected at a pH above about 8 whereby any magnesium present in the brine or regenerating effluent is also precipitated as magnesium hydroxide.

* * * * *

UNITED STATES PATENT AND TRADEMARK OFFICE
CERTIFICATE OF CORRECTION

PATENT NO. : 4,078,978
DATED : March 14, 1978
INVENTOR(S) : Eberhard Zirngiebl

It is certified that error appears in the above-identified patent and that said Letters Patent are hereby corrected as shown below:

Col.4, line 26, change "absorbed" to -- adsorbed --.

Signed and Sealed this

Eighth Day of August 1978

[SEAL]

Attest:

RUTH C. MASON
*Attesting Officer*

DONALD W. BANNER
*Commissioner of Patents and Trademarks*